United States Patent [19]

Baum

[11] 3,891,714
[45] June 24, 1975

[54] PHENOXY CONTAINING BRANCHED CHAIN ALKYL SULFIDES

[75] Inventor: John W. Baum, Palo Alto, Calif.

[73] Assignee: Zoecon Corporation, Palo Alto, Calif.

[22] Filed: May 29, 1973

[21] Appl. No.: 364,459

Related U.S. Application Data

[63] Continuation-in-part of Ser. Nos. 170,387, Aug. 9, 1971, abandoned, and Ser. No. 197,952, Nov. 11, 1971, Pat. No. 3,737,442.

[52] U.S. Cl............ 260/609 F; 260/340.5; 260/516; 260/609 R; 260/340.2; 260/327 R; 260/306; 424/327

[51] Int. Cl.² ...................................... C07C 149/32

[58] Field of Search................................. 260/609 F

[56] References Cited
UNITED STATES PATENTS
3,627,845  12/1971  Hickner.......................... 260/609 F Primary Examiner—Lewis Gotts
Assistant Examiner—D. R. Phillips
Attorney, Agent, or Firm—Donald W. Erickson

[57] ABSTRACT

Novel phenyl compounds prepared by the alkylation of phenol or a phenol derivative using an aliphatic alkylating wherein the carbon chain contains a thia group useful for the control of insects.

6 Claims, No Drawings

PHENOXY CONTAINING BRANCHED CHAIN ALKYL SULFIDES

This is a continuation-in-part of Ser. No. 170,387, filed Aug. 9, 1971, now abandoned and Ser. No. 197,952, filed Nov. 11, 1971, now U.S. Pat. No. 3,737,442, of which are herein incorporated by reference.

This invention relates to novel phenyl compounds, intermediates therefor, and the preparation thereof.

More particularly, the novel phenyl compounds of the present invention are those of the following formulas I and II:

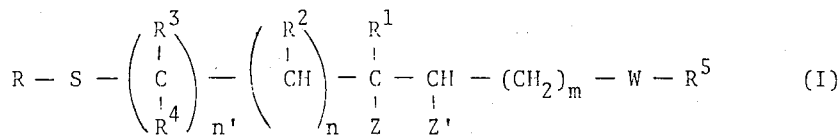

(I)

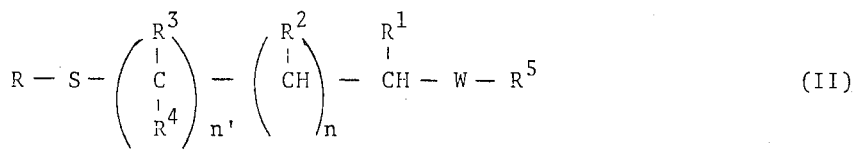

(II)

wherein,
$n$ is zero, one, two, three or four; $n'$ is zero or one;
$m$ is zero, one or two;
each of Z and Z' is hydrogen or Z and Z' together form a carbon-carbon bond;
W is oxygen atom, sulfur atom, sulfinyl or sulfonyl;
each of $R^1$, $R^2$, $R^3$ and $R^4$ is hydrogen or lower alkyl;
R is lower alkyl, aryl, aralkyl or cycloalkyl;
$R^5$ is one of the groups

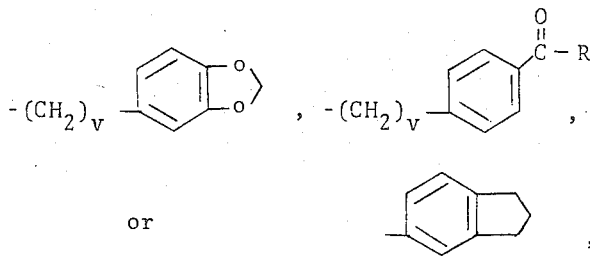

in which, $v$ is zero or one; $R^6$ is hydrogen, lower alkyl, cycloalkyl, aralkyl or lower alkoxy; X is halo, Y is lower alkyl, lower alkenyl, lower alkoxy, nitro, cyano, nitroso, halomethyl, dihalomethyl, trihalomethyl, lower alkylthio, lower alkylsulfinyl or lower alkylsulfonyl; $p$ is zero or a positive integer of one to five; and $q$ is zero or a positive integer of one to three, the sum of $p$ and $q$ being not more than five; or $WR^5$ is selected from the following groups,

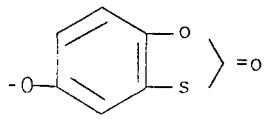 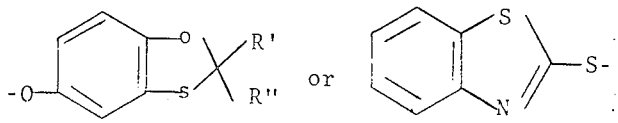

in which each of R' and R'' is hydrogen or lower alkyl; and provided that in formula I, when $m$ is zero—then each of Z and Z' is hydrogen.

The term "lower alkyl", as used herein, refers to an alkyl group, straight or branched, having a chain length of one to six carbon atoms. The term "cycloalkyl", as used herein, refers to a cycloalkyl of four to eight carbon atoms. The term "aralkyl", as used herein refers to aralkyl or seven to 12 carbon atoms, such as benzyl, methylbenzyl, and the like.

The term "aryl", as used herein, refers to an aryl group of six to 12 carbon atoms such as phenyl, methylphenyl, ethylphenyl, and the like. The term "halo" refers to bromo, chloro, fluoro or iodo.

In the description hereinafter, each of R, R', R'', $R^1$-$R^6$, Z, Z', $p$, $q$, $m$, $n$, $n'$, $v$, W, X, and $y$ is as defined hereinabove unless otherwise stated.

The compounds of formulas I and II are prepared alkylating the respective phenyl compound using an alkylating agent of the formula I' and II' in the presence of base in an organic solvent inert to the reaction

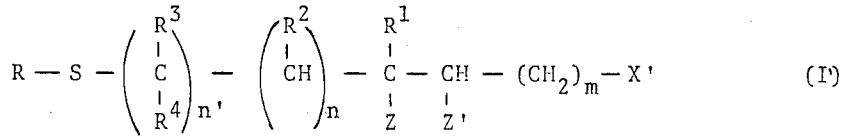

(I')

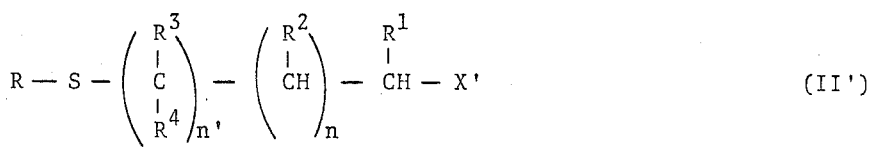

(II')

In the above formula, X' is a leaving group such as bromo, chloro, iodo and methanesulfonyloxy.

The alkylating agent can be prepared according to the following outlined procedure ($R^8$ is hydrogen or lower alkyl and $m'$ is zero or one):

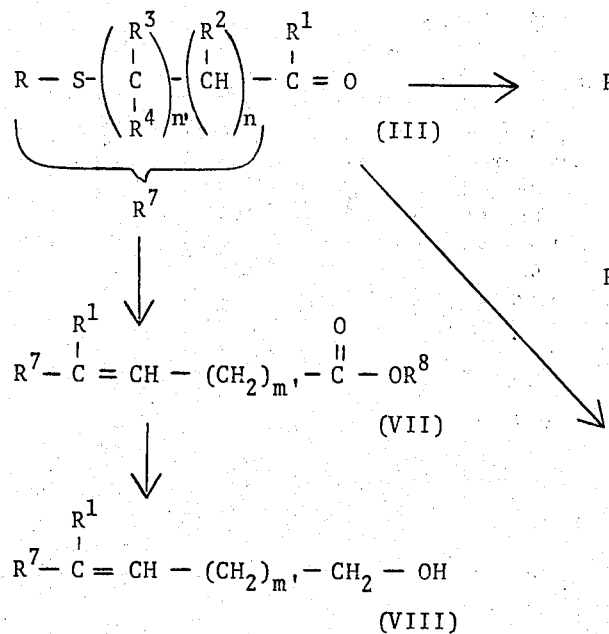

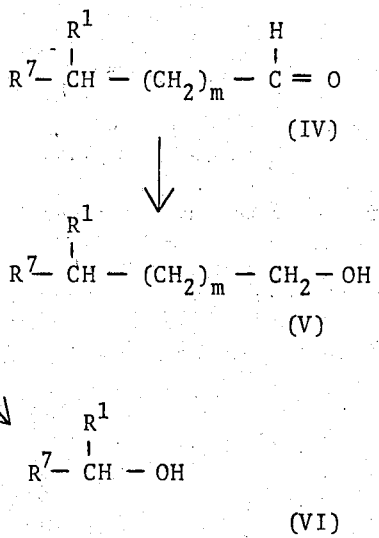

In the practice of the above syntheses, a ketone of formula III is reacted with methoxymethyltriphenylphosphonium chloride in the presence of phenyl lithium, butyl lithium or the like to give an aldehyde of formula (IV) wherein $m$ is zero. The reaction is repeated on the thus obtained aldehyde to form an aldehyde of formula (IV) wherein $m$ is one. An aldehyde of formula (IV) is then reduced using sodium borohydride or the like to yield the primary alcohol (V). Similarly, the secondary alcohol (VI) is prepared by reduction of the ketone (III). An alcohol of formula V or VI is then converted into the halide by treatment with a phosphorous halide, or the like or into the mesylate using the method of Crossland et al J. Org. Chem. 35 3195 (1970). In the preparation of the unsaturated alkylating agents (Z and Z' together for a carbon-carbon bond), a ketone or formula (III') is reacted with the carbanion of dialkyl carbalkoxyphosphonate to yield an ester of formula (VII) wherein $m'$ is zero and with β-carboxyethyltriphenylphosphonium chloride in the presence of base to yield and acid of formula VII wherein $m'$ is one using the procedure of Corey et al, J. Am. Chem. Soc. 86, 1884 (1964). An ester or acid of formula (VII) is reduced using lithium aluminum hydride or the like to yield an alcohol of formula VIII which is converted into the halide using phosphorus trihalide or the like.

The ketone of formula III can be prepared by several methods. One suitable method is the reaction of an alkali mercaptide with the appropriate halo-ketone. Another method is the reaction of an alkyl vinyl ketone with the appropriate thiol. See Cain and Cunneen, J. Chem. Soc., 2959 (1962) and references cited therein and U.S. Pat. Nos. 2,492,334 and 3.098,078.

Another method for preparation of alkylating agents of formula I' is the reaction of the appropriate borate ester with mercaptan to form (V). Tetrahedron Letters No. 47,4155 (1969).

The compounds of formulae I and II include lower alkyl or lower alkoxy substituted phenyl, i.e. wherein Y is lower alkyl or lower alkoxy, which are exemplified by 4-ethylphenyl, 3-ethylphenyl, 2-ethylphenyl, 3,5-dimethylphenyl, 3,4-dimethylphenyl, 2,6-dimethylphenyl, 2,5-dimethylphenyl, 2,4-dimethylphenyl, 2,3-dimethylphenyl, 2,6-dimethylphenyl diisopropylphenyl, 3,5-di-t-butylphenyl, 2,6-di-sec-butylphenyl, 2,5-di-t-butylphenyl, 2,4-di-t-butylphenyl, 2,6-di-t-butyl-4-methylphenyl, 4-t-butylphenyl, 3-t-butylphenyl, 4-sec-butylphenyl, 2-t-butylphenyl, 2-sec-butylphenyl, 4-t-butyl-2-methylphenyl 2-t-butyl-6-methylphenyl, -2-t-butyl-5-methylphenyl,2-t-butyl-4-methylphenyl, 4-t-amylphenyl, 2-isopropylphenyl, 3-isopropylphenyl, 2-n-propylphenyl, 4-n-propylphenyl, 2,3,5,6-tetramethylphenyl, 2,4,6-tri-t-butylphenyl, 2,3,5-trimethylphenyl, 2,3,6-trimethylphenyl, 2,4,6-trimethylphenyl, 3,4,5-trimethylphenyl, 4-isopropylphenyl, 2-methyl-4,6-dinitrophenyl, 2-methyl-4-chlorophenyl, 2-chloro-4-t-butylphenyl, 2-chloro-4,5-dimethylphenyl, 2,6-dimethyl-4-nitrosophenyl, 2,6-dimethyl-4-nitrophenyl, 2,6-diethyl-4-nitrophenyl, 2,4-dichloro-6-methylphenyl 2,4-dichloro-5-methylphenyl, 2,6-di-t-butyl-4-nitrosophenyl, 2,6 -dibromo-4-methylphenyl, s4-chloro-2,3-6-trimethylphenyl, 4-chloro-3-methylphenyl, 4-chloro-2-methylphenyl, 2-chloro-6-methylphenyl, 4-chloro-3,5-dimethylphenyl, 4-chloro-2,6-dimethylphenyl, 4-chloro-2,5-dimethylphenyl, 2-chloro-4,5-dimethylphenyl, 4-t-butyl-2-chloro-phenyl, 2-bromo-4-methylphenyl, 4-bromo-3,5-dimethylphenyl, 2-bromo-4,5-dimethylphenyl, 2-methyl-3-nitrophenyl, 3-methyl-4-nitrophenyl, 4-methyl-3-nitrophenyl, 5-methyl-2-nitrophenyl, 2-methyl-4-nitrosophenyl, 3-methyl-4-nitrosophenyl and 2-methoxy-4-methylphenyl and lower alkoxyphenyl, such as 3,5-dimethoxyphenyl, 2,6-dimethoxyphenyl, 2,3,-dimethoxyphenyl, 4-n-butoxyphenyl, 4-methoxyphenyl, 4-ethoxyphenyl, 2-ethoxy-4-nitrophenyl, 2-methoxy-4-nitrophenyl, 2-methoxy-4-chlorophenyl and 3-methoxyphenyl.

Examples of other phenyl groups (R⁵) and 4-nitrosophenyl, 2-chloro-4-nitrosophenyl, 2-chloromethyl-4-nitrophenyl, 3-trifluoromethyl-2,4,6-trinitrophenyl, 4-cyanophenyl, 3-cyanophenyl, 2-cyanophenyl, 4-methylthiophenyl, 4-trifluoromethylphenyl, 3-trifluoromethyphenyl, 2,5-dichloro-4-methoxyphenyl, 2,6-dichloro-4-(methylsulfonyl) phenyl, 3,5-dichloro-4-(methylsulfonyl) phenyl and dichloro-4-methylthiophenyl.

Examples of other phenyl groups (R⁵) of the compounds of the present invention are 2-chloro-4-bromophenyl, 2-, 3- or 4-chlorophenyl, 2,3-, 2,4-, 2,5-, 2,6-, 3,4- or 3,5-dichlorophenyl, 2,3,4-, 2,3,6-, 2,3,5-, 2,4,5-, 2,4,6- or 3,4,5-trichlorophenyl, pentachlorophenyl, pentabromophenyl, pentafluorophenyl, 2,3,4,6-tetrachlorophenyl, 2,3,5,6-tetrafluorophenyl, 2,4,6-tribromophenyl, 2,4,6-triiodophenyl, 4-bromo-2,6-dichlorophenyl, 4-iodophenyl, 2-, 3-, or 4-fluorophenyl, 2-, 3- or 4-bromophenyl and 4-iodophenyl.

The novel compounds of formulas I and II are useful for the control of insects. They are generally applied to the immature insect, namely 13 during the embryo, larvae or pupae stage. These compounds are effective control agents for Hemipteran such as *Lygaeidae*, *Miridae* and *Pyrrhocoridae;* Coleopteran such as *Tenebrionidae;* Lepidopteran such as *Pyralidae*, *Noctuidae* and *Gelechiidae;* Dipteran such as mosquitoes; Orthoptera such as roaches; and Homoptera such as aphids. The compounds can be applied at low dosage levels of the order of 0.1 μg. to 25 μg. per insect. Suitable carrier substances include liquid or solid carriers such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 75% of the active compound is employed. The formulation can include insect attractants emulsifying agents and wetting agents to assist in the application and efficiency of the active ingredient.

The following examples are provided to illustrate the practice of the present invention. Temperature is given in degrees Centigrade.

EXAMPLE 1

A. A mixture of 2.06 g. of boric acid, 10.0 g. of 3-methylpent-4-en-1-ol and 100 ml. of benzene is refluxed, with continuous removal of water, overnight to yield the borate ester of 3-methylpent-4-en-1ol.

B. To a mixture of 8.5 g. of the borate of part A and 300 mg. of 2,2'-azobis-(2-methylpropionitrile), under nitrogen, is added 10 ml. of isopropyl mercaptan. The reaction mixture is heated in an oil bath, with stirring, to reflux for about 4 hours. After cooling to about room temperature, the crude product is taken up in ether, washed with water, 5% sodium bicarbonate, water and brine, dried over calcium sulfate and solvent evaporated to yield 3,7-dimethyl-6-thia-octan-1-ol (6-thiacitronello) which can be purified by distillation.

C. To a mixture of 8.82 g. of 6-thia-3,7-dimethyloctan-1-ol, 7.58 g. of triethylamine and 250 ml. of methylene chloride, under nitrogen, at about −10° to 0°, is added slowly 6.70 g. of methanesulfonyl chloride with stirring. After addition is complete, stirring is continuted about 15 minutes and then 150 ml. of ice/water is added. The reaction is worked up by washing with cold 10% HCl 5% sodium bicarbonate, cold water and brine, dried over calcium sulfate and solvent evaporated to yield the mesylate of 6-thia-3,7-dimethyloctan-1-ol.

D. A mixture of 3.20 g. of p-ethylphenol, 6.90 g. of potassium carbonate and 12.5 ml. of dimethylformamide is heated, with stirring and under nitrogen, at 60°–70° for 1 hour. Then 6.05 g. of the mesylate of part C is added in dimethylformamide. The reaction is continued overnight at 60°–70°. The reaction is then oured into ice/water and extracted with hexane/ether (1/1). The extract is washed with 2N of sodium hydroxide, water and brine, dried over calcium sulfate and evaporated to yield 6-thia-3,7-dimethyloctanyl p-ethylphenyl ether [1-(6'-thia-3', 7'-dimethyloctanyloxy)-4-ethylbenzene] which can be purified by distillation.

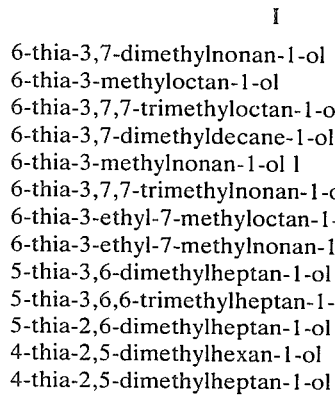

E. The process of part D is repeated with the exception of using 3.62 g. of sesamol in place of p-ethylphenol to produce 1-(6'-thia-3', 7'-dimethyloctanyloxy)-3,4-methylenedioxybenzene (6-thia-3,7-dimethyloctanyl 3,4-methylenedioxyphenyl ether).

EXAMPLE 2

The procedure of part B of example 1 is repeated using the borate ester of 2-methylpent-4-en-1-ol to yield 5-thia-2,6-dimethylheptane-1-ol which is converted into the mesylate using the procedure of Example 1(C). The mesylate is used in the process of Example 1 (D) to yield 5-thia-2,6-dimethylheptanyl p-ethylphenyl ether.

EXAMPLE 3

Following the procedure of Example 1 (D), the mesylate of each of the compounds under column I is reacted with p-ethyl phenol to prepare the respective p-ethyl phenyl ether under column II.

I 6-thia-3,7-dimethylnonan-1-ol
6-thia-3-methyloctan-1-ol
6-thia-3,7,7-trimethyloctan-1-ol
6-thia-3,7-dimethyldecane-1-ol
6-thia-3-methylnonan-1-ol 1
6-thia-3,7,7-trimethylnonan-1-ol
6-thia-3-ethyl-7-methyloctan-1-ol
6-thia-3-ethyl-7-methylnonan-1-ol
5-thia-3,6-dimethylheptan-1-ol
5-thia-3,6,6-trimethylheptan-1-ol
5-thia-2,6-dimethylheptan-1-ol
4-thia-2,5-dimethylhexan-1-ol
4-thia-2,5-dimethylheptan-1-ol

II 6-thia-3,7-dimethylnonanyl p-ethylphenyl ether
6-thia-3-methyloctanyl p-ethylphenyl ether
6-thia-3,7,7-trimethyloctanyl p-ethylphenyl ether
6-thia-3,7-dimethyldecanyl p-ethylphenyl ether
6-thia-3-methylnonanyl p-ethylphenyl ether
6-thia-3,7,7-trimethylnonanyl p-ethylphenyl ether
6-thia-3-ethyl-7-methyloctanyl p-ethylphenyl ether 6-thia-3-ethyl-7-methylnonanyl p-ethylphenyl ether
5-thia-3,6-dimethylheptanyl p-ethylphenyl ether
5-thia-3,6,6-trimethylheptanyl p-ethylphenyl ether
5-thia-2,6-dimethylheptanyl p-ethylphenyl ether
4-thia-2,5-dimethylhexanyl p-ethylphenyl ether
4-thia-2,5-dimethylhepthanyl p-ethylphenyl ether

EXAMPLE 4

The C-1 mesylate of each of the compounds under column I is reacted with p-methylthiophenol to prepare each of the respective ethers under column III.

III 6-thia-3,7-dimethylnonanyl p-methylthiophenyl ether
6-thia-3-methyloctanyl p-methylthiophenyl ether
6-thia-3,7,7-trimethyloctanyl p-methylthiophenyl ether
6-thia-3,7-dimethyldecanyl p-methylthiophenyl ether
6-thia-3-methylnonanyl p-methylthiophenyl ether
6-thia-3,7,7-trimethylnonanyl p-methylthiophenyl ether
6-thia-3-ethyl-7-methyloctanyl p-methylthiophenyl ether
6-thia-3-ethyl-7-methylnonanyl p-methylthiophenyl ether
5-thia-3,6-dimethylheptanyl p-methylthiophenyl ether
5-thia-3,6,6-trimethylheptanyl p-methylthiophenyl ether
5-thia-2,6-dimethylheptanyl p-methylthiophenyl ether
4-thia-2,5-dimethylhexanyl p-methylthiophenyl ether
4-thia-2,5-dimethylheptanyl p-methylthiophenyl ether The reaction of 1-methanesulfonyloxy-3,7-dimethyl-6-thia-octane with p-methylthiophenol using the process of Example 1 (D) yields 6-thia-3,7-dimethyloctanyl p-methylthiophenyl ether.

EXAMPLE 5

Using the procedure of Example 1(D), 1-methanesulfonyloxy-3-methyl-6-thia-7-phenylheptane in reacted with p-ethylphenol to prepare 6-thia-3-methyl-7-phenylheptanyl p-ethylphenyl ether.

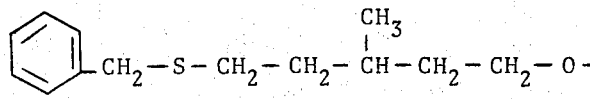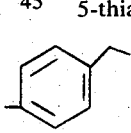

EXAMPLE 6

By using the procedure of Example 1 (D), the sesamol ethers under column IV are prepared by the reaction of sesamol with the C-1 mesylate of each of the alcohols under column I.

IV 6-thia-3,7-dimethylnonanyl-3,4-methylenedioxyphenyl ether
6-thia-3-methyloctanyl-3,4-methylenedioxyphenyl ether
6-thia-3,7,7-trimethyloctanyl-3,4-methylenedioxyphenyl ether
6-thia--3,7-dimethyldecanyl-3,4-methylenedioxyphenyl ether
6-thia-3-methylnonanyl-3,4-methylenedioxyphenyl ether
6-thia-3,7,7-trimethylnonanyl--3,4-methylenedioxyphenyl ether
6-thia-3-ethyl-7-methyloctanyl-3,4-methylenedioxyphenyl ether
6-thia-3-ethyl-7-methylnonanyl-3,4-methylenedioxyphenyl ether
5-thia-3-dimethylheptanyl-3,4-methylenedioxyphenyl ether
5-thia-3,6,6-trimethylheptanyl-3,4-methylenedioxyphenyl ether
5-thia-2,6-dimethylheptanyl-3,4-methylenedioxyphenyl ether
4-thia-2,5-dimethylhexanyl-3,4-methylenedioxyphenyl ether
4-thia-2,5-dimethylheptanyl-3,4-methylenedioxyphenyl ether The use of piperanol in foregoing prodecure in place of sesamol yields the respective piperanyl ethers, e.g., 6-thia-3,7-dimethylnonanyl 3,4-methylenedioxybenzyl ether

EXAMPLE 7

A solution of 4.8 g. of 6-thia-3,7-dimethyloctan-1-ol and 40 ml. of ether is added to 2,4 g. of phosphorous tribromide in ether at about −50° over about 30 minutes. The reaction mixture is stirred for about 2 hours, poured onto ice and then extracted with ether. The ether extracts are combined, washed with 10% sodium carbonate, wafer and brine, dried over calcium sulfate and solvent removed to yeild 6-thia-3,7-dimethyloctanyl bromide.

Each of the compounds under column I is converted into the respective bromide under column V using the prodecure of this example.

V 6-thia-3,7-dimethylnonanyl bromide
6-thia-3-methyloctanyl bromide
6-thia-3,7,7-trimethyloctanyl bromide
6-thia-3,7-dimethyldecanyl bromide
6-thia-3-methylnonanyl bromide
6-thia-3,7,7-trimethylnonanyl bromide
6-thia-3-ethyl-7-methyloctanyl bromide
6-thia-3-ethyl-7-methylnonanyl bromide
5-thia-3,6-dimethylheptanyl bromide
5-thia-3,6,6-trimethylheptanyl bromide
5-thia-2,6-dimethylheptanyl bromide
4-thia-2,5-dimethylhexanyl bromide
4-thia-2,5-dimethylheptanyl bromide By repeating the foregoing process using phosphorous trichloride in place of phosphorous tribromide, the respective chlorides are prepared, e.g., 6-thia-3,7-dimethyloctanyl chloride.

EXAMPLE 8

Three grams of methyl p-hydroxybenzoate and 4.8 g. of 6-thia-3,7-dimethyloctanyl bromide are added at about 20° to methanolic sodium methoxide (0.5 of sodium and 7 ml. of methanol) and the mixture refluxed for four hours. After cooling to about 20°, the sodium bromide is filtered off and the filtrate concentrated. The concentrate is diluted with water and then extracted with ether. The ethereal extracts are combined, dried over calcium sulfate and evaporated under reduced pressure to yield methyl 4-(6'-thia-3',7'-dimethyloctanyloxy) benzoate which can be purified by chromatography.

Using ethyl p-hydroxybenzoate and isopropyl P-hydroxybenzoate in the foregoing process yields ethyl 4-(6'-thia-3',7'-dimethyloctanyloxy) benzoate and isopropyl 4-(6'-thia-3',7'-dimethyloctanyloxy) benzoate.

In the same way, each of the bromides under column V is reacted with alkyl p-hydroxybenzoates such as methyl p-hydroxybenzoate to yield the respective phenyl compound, e.g., methyl 4-(6'-thia-3',7'-dimethylnonanyloxy) benzoate.

EXAMPLE 9

A mixture of 0.4 g. of sesamol, 0.4 g. of potassium carbonate, 0.58 g. of 6-thia-3,7-dimethyloctanyl bromide and 20 ml. of acetone, under nitrogen, is stirred at room temperature for about 30 hours. The mixture is then poured into water and extracted with ether. The ethereal extract is washed with cold 2N sodium hydroxide water and brine, dried over calcium sulfate and evaporated to yield 6-thia-3,7-dimethyloctanyl 3,4-methylenedioxyphenyl ether.

EXAMPLE 10

A. To a solution of 4.8 g. of 6-thia-3,7-dimethylnon-2-en-1-ol and 40 ml. of ether, at about −50°, is added 2.44 g. of phosphorous tribromide in about 10 ml. of ether over 0.5 hour. The mixture is stirred for 2 hours, poured onto ice and extracted with ether. The etheral extracts are combined, washed with dilute sodium carbonate, water and brine, dried over calcium sulfate and concentrated to yield 6-thia-3,7dimethylnon-2-ethyl bromide.

B. To a suspension of 1 g. of sodium hydride (washed with pentane) in 10 ml. of tetrahydrofuran, under argon, and cooled to 4° is added 3.3 g. ofsesamol in 15 ml. of tetrahydrofuran over one hour. The mixture is stirred for about 16 hours.

To the above prepared solution salt solution of sesamol, cooled in an ice-bath, is added with ether, the concentrate of the allylic bromide from part A slowly. After 2 hours, the mixture is warmed to room temperature and allowed to stand about 16 hours. The mixture is poured into water and extracted with ether. The ethereal extracts are combined, washed with 10% NaOH, water and saturated sodium chloride, dried over sodium sulfate and solvents evaporated to yield 6-thia-3,7-dimethylnon-2-enyloxy 3,4-methylenedioxyphenyl ether which can be purified by chromatography.

EXAMPLE 11

The process of Example 10 (A) is repeated using each of the compounds under column VI as the starting material to prepare the respective bromide under column VII.

VI 6-thia-3,7-dimethyloct-2-en-1ol
5-thia-3,6-dimethylhept-2-en-1-ol
6-thia-3,7,7-trimethyloct-2-en-1-ol
6-thia-3,7,7-trimethylnon-2-en---ol
7-thia-4,8-dimethylnon-3-en-1-ol
6-thia-4,7-dimethyloct-3-en-1-ol

VII 6-thia-3,7-dimethyloct-2-enyl bromide
5-thia-3,6-dimethylhept-2-enyl bromide
6-thia-3,7,7-trimethyloct-2-enyl bromide
6-thia-3,7,7-trimethylnon-2enyl bromide
7-thia-4,8-dimethylnon-3-enyl bromide
6-thia-4,7-dimethyloct-3-enyl bromide

EXAMPLE 12

Following the procedure of Example 9 or 10 (B), 6-thia 3,7-dimethylnon-2-enyl bromide and each of the bromides under column VII is reacted with p-ethyl phenol to prepare the respective phenyl ether under column VIII.

VIII 6-thia-3,7-dimethylnon-2-enyl p-ethylphenyl ether
6-thia-3,7-dimethyloct-2-enyl p-ethylphenyl ether
5-thia-3,6-dimethylhept-2enyl p-ethylphenyl ether
6-thia-3,7,7-trimethyloct-2-enyl p-ethylphenyl ether
6-thia-3,7,7-trimethylnon-2-enyl p-ethylphenyl ether
7-thia-4,8-dimethylnon-3-enyl p-ethylphenyl ether
6-thia-4,7-dimethyloct-3-enyl p-ethylphenyl ether Similarly, there is prepared each of the following p-methylthiophenyl ethers from p-methylthiophenol.

6-thia-3,7-dimethylnon-2-enyl p-methylthiophenyl ether
6-thia-3,7-dimethyloct-2-enyl p-methylthiophenyl ether
5-thia-3,6-dimethylhept-2-enyl p-methylthiophenyl ether
6-thia-3,7,7-trimethyloct-2-enyl p-methylthiophenyl ether
6-thia-3,7,7-trimethylnon-2-enyl p-methylthiophenyl ether
7-thia-4,8-dimethylnon-3-enyl p-methylthiophenyl ether
6-thia-4,7-dimethyloct-3-enyl p-methylthiophenyl ether

EXAMPLE 13

To a solution of 2 g. of sodium in 50 ml. of ethanol at 0° is added 15 g. of p-ethylphenyl mercaptan. After about 0.5 hour, 20 g. of 6-thia-3,7-dimethyloctanyl bromide is added and then the mixture is refluxed for about 2 hours. The solvent is evaporated and the concentrate taken up in petroleum ether which is washed with water, dried over calcium sulfate and evaporated under reduced pressure to yield 1-(4'-ethylphenyl) thi-a-3,7-dimethyl-6-thia-octane (6-thia-3,7-dimethyloctanyl p-ethylphenyl sulfide) which can be purified by chromatography.

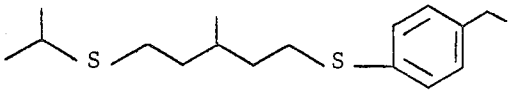

As an alternative process, there can be used the process of EXAMPLE 1(D) with the exception of substituting an appropriate phenyl mercaptan such as p-ethylphenyl mercaptan in place of the p-ethylphenol.

Each of 6-thia-3,7-dimethyloct-2-enyl p-ethylphenyl sulfide, 6-thia-3,7,-dimethylnon-2-enyl p-ethylphenyl sulfide, 5-thia-3,6-dimethylhept-2-enyl p-ethylphenyl sulfide, and 6-thia 3,7,7-trimetyloct-2-enyl p- ethylphenyl sulfide is prepared using the process of this example by the alkylation of p-ethylphenyl mercaptan using 6-thia-3,7-dimethyloct-2-enyl bromide, 6-thia-3,7-dimethylnon-2-enyl bromde, 5-thia-5,6-dimethylhept-2-enyl bromide and 6-thia-3,7,7-trimethyloct-2-enyl bromide.

Following the procedure of Example 1 (D), the mesylate of each of 6-thia-3,7-dimetyl-nonan-1-ol, 6-thia-3,7,7-trimethyloctan-1-ol, 5-thia-3,6-dimethylheptan-1ol, 4-thia-2,5-dimethylhexan-1-ol and 6-thia-3-ethyl-7-methylnonan-1-ol is reacted with p-ethylphenyl mercaptan to prepare each of 6-thia-3,7-dimethylnonanyl p-ethylphenyl sulfide,
6-thia-3,7,7-trimethyloctanyl p-ethylphenyl sulfide,
5-thia-3,6-dimethylheptanyl p-ethylphenyl sulfide,
4-thia-2,5-dimethylhexanyl p-ethylphenyl sulfide,
6-thia-3-ethyl-7methylnonanyl p-ethylphenyl sulfide, respectively.

EXAMPLE 14

Each of p-nitrophenol, p-chlorophenol, 2,3,4-trichlorophenol, 3-ethylphenol, p-t-butylphenol, p-trifluoromethylphenol, p-ethoxyphenol, 3-ethyl-4-chlorophenol, 2-methyl-4-ethylphenol, 2-chloro-4-t-butylphenol, 2-chloro-4,5-dimethylphenol, p-allylphenol, p-(1'-propenyl) phenol, p-sec-butylphenol, p-ethylthiophenol, 3-chloro-4-ethylphenol, 2,4,6-trichlorophenol, 3,4-dichlorophenol, 2,4-dichlorophenol, 2,4,5-trichlorophenol, 2,3,4,6-tetrachlorophenol, p-methylphenol and p-isopropylphenol is alkylated using the mesylate of 6-thia-3,7-dimethyloctan-1-ol according to the process of Example 1(D) to prepare the respective ether under column IX i.e.,

XI 6-thia-3,7-dimethyloctanyl p-nitrophenyl ether,
6-thia-3,7-dimethyloctanyl p-chlorophenyl ether,
6 3,7-dimethyloctanyl 2,3,4-trichlorophenyl ether,
6-thia-3,7-dimethyloctanyl 3-ethylphenyl ether,
6-thia-3,7-dimethyloctanyl p-t-butlphenyl ether,
6-thia-3,7-dimethyloctanyl p-trifluoromethylphenyl ether,
6-thia-3,7-dimethyloctanyl p-trifluoromethylphenyl, ether,
6-thia-3,7 -dimethyloctanyl 3-ethyl-4-chlorophenyl ether,
6-thia-3,7-dimethyloctanyl 2-methyl-4-ethylphenyl ether,
6-thia-3,7-dimethyloctanyl 2-chloro-4-butylphenyl ether,
6-thia-3,7-dimethyloctanyl 2-chloro-4,5-dimethylphenyl ether
6-thia-3,7-dimethyloctanyl p-allylphenyl ether,
6-thia-3,7-dimethyloctanyl p-(1'-propenyl)phenyl ether,
6-thia-3,7-dimethyloctanyl p-sec- butylphenyl ether,
6-thia-3,7-dimethyloctanyl p-ethylthiphenyl ether,
6-thia-3,7-dimethyloctanyl 3-chloro-4-ethylphenyl ether,
6-thia-3,7-dimethyloctanyl 2,4,6-trichlorophenyl ether,
6-thia-3,7-dimethyloctanyl 3,4-dichlorophenyl ether,
6-thia-3,7-dimethyloctanyl 2,4-dichlorophenyl ether,
6-thia-3,7-dimethyloctanyl 2,4,5-trichlorpheny ether,
6-thia-3,7-dimethyloctanyl 2,3,4,6-tetrachlorophenyl ether,
6-thia-3,7-dimethyloctanyl p-methylphenyl ether,
6-thia-3,7-dimethyloctanyl p-isopropylphenyl ether.

In the same way the mesylate of each of the compounds under column I is used as the alkylating agent in the procedure of Example 1(D) with the phenols of Part A of this example to prepare the respective substituted phenyl ethers of formula I, e.g., 6-thia-3,7-dimethylnonanyl p-nitrophenyl ether, 6-thia-3,7-dimethylnonanyl p-chlorophenyl ether, 6-thia-3,7-dimethylnonanyl 2,3,4-trichorophenyl ether, etc.

B. By use of the procedures herein (see Example 9 and 10 ) each of the phenols of Part A of this example is alkylated using each of the bromides under column VII to prepare the respective substituted phenyl ether, for example, 6-thia-3,7-dimethyloct-2-enyl p-nitrophenyl ether,
6-thia-3,7-dimethyloct-2-enyl p-chlorophenyl ether,
6-thia-3,7dimethyloct2-enyl 3-ethylphenyl ether,
6-thia-3,7-dimethyloct-2-enyl 2,3,4-trichlorophenyl ether,
6-thia-3,7-dimethyloct-2-enyl p-t-butylphenyl ether,
6-thia-3,7-dimethyloct- 2-enyl p-trifluoromethylphenyl ether,
6-thia-3,7-dimethyloct-2-enyl p-ethoxyphenyl ether,
6-thia-3,7-dimethyloct-2-enyl 3-ethyl-4-chlorophenyl ether,
6thia-3,7-dimethyloct-2enyl 2-methyl 4-ethylphenyl ether,
6-thia-3,7-dimethyloct-2-enyl 2-chloro-4-t-butylphenyl ether,
6-thia-3,7-dimethyloct-2-enyl 2-chloro-4-5-dimethylphenyl ether,
6-thia-3,7-dimethyloct-2-enyl p-allylphenyl ether,
6-thia-3,7-dimethyloct -2-enyl p-(1'-propenyl) phenyl ether,
6-thia-3,7-dimethyloct-2-enyl p-sec-butylphenyl ether,
6-thia-3,7-dimethyloct-2enyl -p-ethylthiophenyl ether,
6-thia-3,7-dimethyloct-2-enyl 3-chloro-4-ethylphenyl ether,
6-thia-3,7-dimethyloct-2-enyl 2,4,6-trichlorophenyl ether,
6-thia-3,7-dimethyloct-2-enyl 3,4-dichlorophenyl ether,
6-thia-3,7-dimethyloct-2-enyl 2,4-dichlorophenyl ether,
6-thia-3,7-dimethyloct-2-enyl 2,4,5-trichlorophenyl ether,
6-thia-3,7-dimethyloct-2-enyl 2,3,4,6-tetrachlorophenyl ether,
6-thia-3,7-dimethyloct-2-enyl p-methylphenyl ether,
6-thia-3,7-dimethyloct-2-enyl p-isopropylphenyl ether,
5-thia-3,6-dimethylhept-2-enyl p-nitrophenyl ether,
5-thia-3,6-dimethylhept-2-enyl p-chlorophenyl ether, etc.

EXAMPLE 15

A. Each of 4-methylsulfonylphenol, 2,4-dimethylthiophenol, 4-methylsulfinylphenol, 4-methylthio-3-ethylphenol, 4-methylthio- 3,5-dimethylphenol, 4-methylthiomethylphenol, 2-allyl-4-chlorophenol 4-s-butenyl-phenol, 4-cyanophenol, 2-allyl-3,5-dichlorophenol, and 2-allyl-6-methoxyphenol is alkylated using the mesylate of 6-thia 3,7-dimethyloctan-1-ol according to the procedure of Example 1(D) to prepare 6-thia-3,7-dimethyloctanyl 4-methylsulfonylphenyl ether
6-thia-3,7-dimethyloctanyl 2,4-dimethylthiophenyl ether
6-thia-3,7-dimethyloctanyl 4-methylsulfinylphenyl ether
6-thia-3,7-dimethyloctanyl 4-methylthio-3-ethylphenyl ether
6-thia-3,7-dimethyloctanyl 4-methylthio-3,5-dimethylphenyl ether
6-thia-3,7-dimethyloctanyl 4-methylthiomethylphenyl ether
6-thia-3,7-dimethyloctanyl 2-allyl-4-chlorophenyl ether
6-thia-3,7-dimethyloctanyl 4-s-butenylphenyl ether
6-thia-3,7-dimethyloctanyl 4-cyanophenyl ether,
6-thia-3,7-dimethyloctanyl 2-ally-3,5-dichlorophenyl ether
6-thia-3,7-dimethyloctanyl 2-allyl-6-methoxyphenyl ether B. Following the procedures herein (see Example 9 and 10) each of the bromides under column VII is used as the alkylating agent with each of the substituted phenols of part A of this example to prepare the respective substituted phenyl ether, e.g., 6-thia-3,7-dimethyloct-2-enyl 4-methylsulfonylphenyl ether
6-thia-3,7-dimethyloct-2enyl 2,4-dimethylthiophenyl ether
6-thia-3-7-dimethyloct-2-enyl 4-methylsulfinylphenyl ether
6-thia-3,7-dimethyloct-2-enyl 4-methylthio-3-ethylphenyl ether
6-thia-3,7-dimethyloct--2-enyl 4-methylthio-3,5-dimethylphenyl ether
6-thia-3,7- dimethyloct-2-enyl 4-methylthiomethylphenyl ether
6-thia-3,7-dimethyloct-2-enyl 2-allyl-4-chlorophenyl ether
6-thia-3,7-dimethyloct-2-enyl 4-s-butenylphenyl ether
6-thia-3,7-dimethyloct-2-enyl 4-cyanophenyl ether
6-thia-3,7-dimethyloct-2-enyl 2-allyl3,5-dichlorophenyl ether
6-thia-3,7-dimethyloct-2-enyl 2-allyl-6-methoxyphenyl ether, etc.

EXAMPLE 16

A mixture of 6.0 g. of 5-hydroxyl-1, 3-benzoxathiol-2-one, 2g. of potassium carbonate, 100 ml. of dimethylformamide and 11 g. of the mesylate of 6-thia-3 7-dimethyloctan-1-ol is prepared, under nitrogen, and heated at 60°with stirring for about 48 hours. The mixture is then filtered directly onto ice, water added followed by extraction with ether: hexane. The combined extracts are washed with water and brine, dried over calcium sulfate and evaporated to yield 5-(6'-thia-3', 7'-dimethyloctanyloxy)-1, 3-benzoxathiol-2-one which is purified by chromatography.

The use of 6-thia-3,7-dimethyloct-2-enyl bromide in the foregoing process yields 5-(6'-thia-3', 7'-dimethyloct-2'-enyloxy)-1, 3-benzoxathiol-2-one.

EXAMPLE 17

Following the procedures herein (see Examples 1, 9 and 10). each of 6-thia-3, 7-dimethyloct-2-enyl bromide and the mesylate of 6-thia-3,7-dimethyloctan-1-ol is reacted with 5-indanol to yield 5-(6'-thia-3', 7'-dimethyloct-2'-enyloxy) indane and 5-(6'-thia-3', 7'-dimethyloctanyloxy) indane.

EXAMPLE 18

To about 30 ml. of deoxygenated dimethylformamide, under nitrogen and at about 25°, is added 1.7 g. of 2-mercaptobenzothiazole, 3.2 g. of the mesylate of 6-thia-3,7-dimethyloctan-1d and 1.5 g. of potassium carbonate. The mixture is heated at about 50°, under nitrogen, for about 4 hours. The mixture is filtered onto ice and then extracted with ether. The ethereal phase is washed with 10% NaOH, water and brine, dried over calcium sulfate and concentrated to yield 2-(6'-thia-3', 7'-dimethyloctanyl) thiobenzothiazole which is purified by chromatography.

By use of the foregoing process, 2-(6'-thia-3', 7'-dimethyloct-2'-enyl) thiobenzothiazole is prepared using 6-thia-3,7-dimethyloct-2-enyl bromide as the alkylating agent.

EXAMPLE 19

To a mixture of 5.0 g. of 5-hydroxyl-1, 3-benzoxathiolane and 6.5 g. of potassium carbonate, under nitrogen and at about 0°, is added 25 ml. of dimethylformamide followed by 5.8 g. of 6-thia-3,7-dimethyloct-2-enyl bromide. The reaction mixture is stirred about 20 hours at room temperature and then filtered. The filtrate is poured onto ice and then extracted with hexane: ether. A trace of methanol is added and the extract washed with cold 2N sodium hydroxide, water and brine, dried over magnesium sulfate and evaporated to yield 5-(6-thia-3', 7'-dimethyloct-2'-enyloxy)-1, 3-benzoxathiolane which can be purified by chromatography.

EXAMPLE 20

A mixture of 5.8 g. of 5-hydroxy-1, 3-benzoxathiolane, 2.0 g. of potassium carbonate and 100 ml. of dimethylformamide, under nitrogen, is prepared and after about 20 minutes, 11g. of the mesylate of 6-thia-3,7-dimethyloctan-1-ol is added. The reaction mixutre is heated at 60°, with stirring, for about 48 hours. After cooling, the mixture is filtered onto ice and water is added to the filtrate followed by extraction with ether: hexane. The extract is washed with water and brine, dried over calcium sulfate and evaporated to yield 5-(6'-thia-3',7'-dimethyloctanyloxy)-1, 3-benzoxathiolane which can be purified by chromatography.

By using each of 5-hydroxy-2, 2-dimethyl-1, 3-benzoxathiolane and 5-hydroxy-2-methyl-1, 3-benzoxathiolane in the process of Examples 19 and 20, there is prepared each of 5-(6'-thia-3', 7'-dimethyloct-2'-enyloxy)-2, 2-dimethyl-1, 3-benzoxathiolane, 5-(6'-thia-3', 7'-dimethyloct -2'-enyloxy)-2-methyl-1, 3-benzoxathiolane, 5-(6'-thia-3', 7'dimethyloct-2'-enyloxy -2-methyl-1, 3-benzoxathiolane, 5-(6'thia 3', 7'-dimethyloctanyloxy)-2, 2-dimethyl-1, 3-benzoxathiolane, 5-(6'-thia-3', 7'-dimethyloctanyloxy)-2, 2-dimethyl-1, 3-benzoxathiolane.

5-hydroxy-1, 3-benzoxathiolane, 5-hydroxy-2-(lower)-alkyl-1, 3-benzoxathiolane, and 5-hydroxy- 2,2-di (lower) alkyl-1, 3-benzoxathiolane can be prepared as described in copending application Ser. No. 144,272, filed May 17, 1971, the disclosure of which is incorporated by reference.

EXAMPLE 21

Following the procedure of Example 9 or 10, the bromide, 2-bromo-5-thia-6-methylheptane is reacted with each of p-ethylphenol,p-ethylphenylmercaptan, sesamol and p-methylthiophenol to prepare 5-thia-6-methylheptan-2-yl p-ethylphenyl ether, 5-thia-6-methylheptan-2-yl p-ethylphenyl sulfide, 5-thia-6-methylheptan-2-yl 3,4-methyl nedioxyphenyl ether, and 5-thia-6-methylheptan-2-yl p-methylthiophenyl ether, respectively.

EXAMPLE 22

To a solution of 2 g. of sodium in 50 ml. of methanol at about 0° is added 35 g. of methyl p-thiobenzoate. After about 0.5 hour, 16.5 g. of 6-thia-3,7-dimethyloct-2-enyl bromide is added and then the mixture refluxed for about two hours. After cooling, the solvent is evaporated and the concentrate taken up in petroleum ether which is washed with water, dried over magnesium sulfate and evaporated under reduced pressure to yield methyl 4-(6'-thia-3', 7'-dimethyloct-2'-enyl) thiobenzoate which can be purified by chromatography By the above procedure, there is prepared methyl 4-(6'-thia-3', 7'-dimethyloctanyl) thiobenzoate using 6-thia-3, 7-dimethyloctanyl bromide as the alkylating agent.

EXAMPLE 23

To a mixture of 1 g. of sodium and 30 ml. of methanol at room temperature is added 5 g. of methyl p-hydroxyphenyl ketone and after a few minutes, 6.5 g. of 6-thia-3, 7-dimethyloct-2-enyl bromide. The reaction mixture is refluxed for about four hours. After cooling, the mixture is diluted with water and then extracted with ether. The ethereal extracts are combined, washed, dried over magnesium sulfate and evaporated under reduced pressure to yield methyl 4-(6'-thia-3, 7'-dimethyloct-2'-enyloxy) phenyl ketone which can be purified by chromatography By use of 6-thia-3, 7-dimethyloctanyl bromide in the foregoing procedure, there is prepared methyl 4-(6'-thia-3', 7'-dimethyloctanyloxy) phenyl ketone.

EXAMPLE 24

To a suspension of 21 g. of methoxymethyltriphenylphosphonium chloride in 200 ml. of absolute ether is added, under nitrogen at room temperature, a solution of 60 mmoles of phenyl lithium in ether. After about 10 minutes, the mixture is cooled to −30° and 7.1 g. of 5thio-6-methylheptan-2-one in ether is added slowly. After about 12 hours at room temperature, the mixture is filtered and the filtrate concentrated. The concentrate is dissolved in aqueous tetrahydrofuran containing a small amount of dilute hydrochloric acid, stirred at room temperature for about 48 hours and then worked up by extraction with ether to yield 5-thia-2, 6-dimethylheptan-1-al which is purified by chromatography.

The above process is repeated using each of the compounds under col. X to prepare the respective compound under col. XI.

X 5-thia-6-methyloctan-2-one
5-thia-heptan-2-one
5-thia-6,6-dimethylheptan-2-one
5-thia-6-methylnonan-2-one
5-thia-octan-2-one
5-thia-6, 6-dimethyloctan-2-one
6-thia-7-methyloctan-3-one
6-thia-7-methylnonan-3-one
4-thia-5-methylhexan-2-one
4-thia-5, 5-dimethylhexan2one 4-thia-5-methylheptan-2-one
6-thia-7-methyloctan-2-one

XI 5-thia-2, 6-dimethyloctan-1-al
5-thia-2-methylheptan-1-al
5-thia-2,6,6-trimethylheptan-1-al
5-thia,2, 6-dimethylnonan-1-al
5-thia-2-methyloctan-1-al
5-thia-2, 6, 6-trimethyloctan-1-al
5-thia-2-ethyl-6-methylheptan-1-al
5-thia-2-ethyl-6-methyloctan-1al
4-thia-2, 5-dimethylhexan-1-al
4-thia-2, 5, 5-trimethylhexan-1-al
4-thia-2, 5-dimethylheptan-1-al
6-thia-2, 7 dimethyloctan-1-al B. Six grams of 5-thia-2,6-dimethylheptan-1-al is added to a mixture of 2.2 g. of sodium borohydride, 100 ml. of methanol and 4ml. of 2N sodium hydroxide and the resulting mixture stirred at room temperature for about three hours. The mixture is then poured into water and extracted with methylene chloride. The extracts are combined, washed dried over magnesium sulfate and evaporated under reduced pressure to yield 5-thia-2,6-dimethylheptan-1-ol which is purified by chromatography.

By use of the foregoing procedure, each of the aldehydes under col. XI is reduced to the alcohol under col XII.

XII 5-thia 2,6-dimethyloctan-1-ol
5-thia-2-methylheptan-1-ol
5-thia-2,6,6-trimethylheptan-1-ol
5-thia-2,6-dimethylnonan-1-ol
5-thia-2-methyloctan-1-ol
5-thia-2,6,6-trimethyloctan-1-ol
5-thia-2-ethyl-6-methylheptan-1-ol
5-thia-2-ethyl-6-methyloctan-b 1-ol
4-thia-2,5-dimethylhexan-1-ol
4-thia-2,5,5-trimethylhexan-1-ol
4-thia-2,5-dimethylheptan-1-ol
6-thia-2,7-dimethyloctan-1-ol C. The C-1 bromide and chloride of each of the alcohols of part B is prepared using the procedure of Example 7.

The C-1 mesylate of each of the alcohols of part B is prepared using the procedure of Example 1(C), e.g. 1-methanesulfonyloxy-5-thia-2,6-dimethylheptane.

EXAMPLE 25

A. The procedure of Example 24 (A) is repeated using 5-thia-2,6-dimethylheptan-1-al and each of the aldehydes under col. XI to prepare the respective aldehyde under col. XIII.

XIII 6-thia-3,7-dimethyloctan-1-al
6-thia-3,7-dimethylnonan-1-al
6-thia-3-methyloctan-1-al
6-thia-3,7,7-trimethyloctan-1-al
6thia-6thia -dimethyldecan-1-al
6-thia-3methylnonan-1al
6-thia-3,7,7-trimethylnonan-1al
6-thia-3-ethyl-7-methyloctan-1-al
6-thia-3-ethyl-7-methylnonan-1-al
5-thia-3,6-dimethylheptan-1-al
5-thia-3,6,6-trimethylheptan-1-al
5-thia-3,6-dimethyloctan-1-al
7-thia-3,8-dimethylnonan-1-al B. Each of the aldehydes under col. XIII is reduced using sodium borohydride to yield the respective C-1alcohol, e.g. 6-thia-3,7-dimethyloctan-1-ol. The alcohol is then converted into the corresponding halide or mesylate using the procedures described herein.

C. Following the procedure of Example 24 (A), 6-thia-3,7-dimethyloctan-1-al is converted into 7-thia-4,8-dimethylnonan-1-al. In the same manner, each of the aldehydes under col. XIII is converted into aldehydes of formula IV wherein m is two.

Example 26

Six grams of 5-thia-6-methylheptan-2-one is added to a solution of 3.0 g. of sodium borohydride, 80 ml. of methanol and 6 ml. of 2N sodium hydroxide solution. After about 2 hours, acetic acid is added to destroy sodium borohydride and the mixture poured into water and extracted with ether. The combined ether extracts are washed with aqueous sodium bicarbonate, water and brine, dried and evaporated to yield 5-thia-6-methylheptan-2-ol which is purified by chromatography.

Using the foregoing procedure, each of the ketones under col. X is reduced to the respective alcohol.

Triphenylphosphite benzoylchloride (10 g.) is mixed with 2g. of 5-thia 6-methylheptan-2-ol and kept at room temperature overnight. The crude product is washed with 2N sodium hydroxide and water and dried to give 2-chloro-5-thia-6-methylheptane.

EXAMPLE 27

A. A mixture of 11.2 g. of diethylcarbomethoxymethyl-phosphonate in 100 ml. of dimethylformamide is treated with 2.4 g. of sodium hydride. The mixture is stirred until the evolution of gas ceases and then 10 g. of 5-thia-6-methylheptan-2-one is added slowly with stirring while maintaining the temperature below 30°. The mixture is stirred for about 1 hour and then diluted with water and extracted with ether. The ethereal phase is washed with water, dried over sodium sulfate and evaporated under reduced pressure to give methyl 6-thia-3,7-dimethyloct-2-enoate which is purified by chromatography.

The above process is repeated using each of the ketones under col. X as the starting material to prepare the respective $\alpha,\beta$-unsaturated ester under col. XIV.

XIV methyl 6-thia-3,7-dimethylnon-2-enoate
methyl 6-thia-3-methyloct-2-enoate
methyl 6-thia-3,7,7-trimethyloct-2-enoate methyl 6-thia-3,7-dimethyldec-2-enoate
methyl 6-thia-3-methylnon-2-enoate
methyl 6-thia-3,7,7-trimethylnon-2-enoate
methyl 6-thia-3-ethyl-7-methyloct-2-enoate methyl 6-thia-3-ethyl-7-methylnon-2-enoate
methyl 5-thia-3,6-dimethylhept-2-enoate methyl 5-thia-3,6,6-trimethylhept-2-enoate
methyl 5-thia-3,6-dimethyloct-2-enoate
methyl 7-thia-3,8-dimethylnon-2-enoate B. To a mixture of 2g. of methyl 6-thia-3,7-dimethyloct-2-enoate and 20 ml. of dry ether at −20°, is added slowly, with stirring, 0.4 g. of lithium aluminum hydride in dry ether. After about 1.5 hours the mixture is allowed to warm to room temperature and 2.5 ml. of acetic acid is added. The mixture is washed with ice water and the ether phase dried and evaporated to give 6-thia-3,7-dimethyloct-2-en1-ol which is purified by chromatography.

Each of the esters under col. XIV is reduced using lithium aluminum hydried to prepare the respective alcohol under col. XV.

XV 6-thia-3,7-dimethylnon-2-en-1-ol
6-thia-3-methyloct-2-en-1-ol
6-thia-3,7,7-trimethyloct-2-en-1-ol
6-thia-3,7dimethyldec 2-en-1-ol
6-thia-3-methylnon-2-en-1-ol
6-thia-3,7,7-trimethylnon-2-en-1-ol 6-thia-3-ethyl-7-methyloct-2-en-1-ol
6-thia-3-ethyl-7-methylnon-2-en-1-ol
5-thia-3,6-dimethylhept-2-en-1-ol
5-thia-3,6,6-trimethylhept-2-en-1-ol
5-thia-3,6-dimethyloct-2-en-1-ol
7-thia-3,8-dimethylnon-2-en-1-ol The alcohol, 6-thia-3,7-dimethyloct-2-en-1-ol is reacted with phosphorous tribromide according to the procedure herein to prepare 6-thia-3,7-dimethyloct-2-enyl bromide. In the same way, the bromide of each of the alcohols under col. XV is prepared.

C. Using the procedure of Corey et al. J. Am. Chem. Soc. 84, 1887 (1964), 5-thia-6-methylheptan-2-one is converted into 7-thia-4.8-dimethylnon-3-enoic acid by reaction with $\beta$-carboxyethyltriphenylphosphonium chloride in dimethylsulfoxide. The thus-obtained acid is then converted into the acid chloride using thionyl chloride or oxalyl chloride at room temperature. The acid chloride is then treated with an alcohol, e.g. methanol or ethanol, at a temperature of about 40° for a few minutes to yield the ester, e.g. methyl 7-thia-4,8-dimethylnon-3-enoate and ethyl 7-thia-4,8-dimethylnon-3-enoate.

By reducing the acid or the ester using lithium aluminum hydride, the corresponding C-1 alcohol is prepared—7-thia-4,8-dimethylnon-3-en-1-ol—which is converted into the C-1 halide, e.g. 7-thia-4,8-dimethylnon-3-enyl bromide, using procedures described above.

By use of the processes of this example, other compounds of formulas VII ($m'$ is one), VIII ($m'$ is one) and I′ ($m$ is two) are prepared using the ketones under col. X as the starting material.

EXAMPLE 28

A suspension of 0.5 g. of 5% palladium-on-carbon catalyst in 50 ml. of benzene is hydrogenated for 30 minutes. A mixture of 1.5 g. of 6-thia-3,7-dimethyloct- 2-en-1-ol in 75 ml. of methanol is added and hydrogenated with agitation until the theoretical amount of hydrogen is absorbed. The catalyst is removed by filtration and the filtrate evaporated to yield 6-thia-3,7-dimethyloctan-1-ol which is purified by chromatography.

By use of the above method, other unsaturated alcohols of Example 27 can be hydrogenated to prepare the corresponding dihydro compound.

EXAMPLE 29

Each of phenol and phenylmercaptan is alkylated using the mesylate of 6-thia-3,7-dimethyloctan-1-ol and the mesylate of 5-thia-2,6-dimethylheptan-1-ol according to the procedure of Example 1 to prepare 6-thia-3,7-dimethyloctanyl phenyl ether,
6-thia-3,7-dimethyloctanyl phenyl sulfide,
5-thia-2,6-dimethylheptanyl phenyl ether, and
5-thia-2,6-dimethylheptanyl phenyl sulfide, respectively.

Each of phenol and phenylmercaptan is alkylated using 6-thia-3,7-dimethyloct-2-enyl bromide to prepare 6-thia-3,7-dimethyloct-2-enyl phenyl ether and 6-thia-3,7-dimethyloct-2-enyl phenyl sulfide.

Three groups of 30 each of *Aedes aegypti*, fourth instar larvae, in 50 ml. of water are treated with 6-thia-3,7-dimethyloctanyl p-ethylphenyl ether using 50 microliters of acetone as the carrier to provide a dosage level of 0.1 ppm, 1.0 ppm and 10.0 ppm. The $ID_{50}$ is 0.024 ppm as computed by plotting on semilogarithmic paper, the dose on the horizontal axis and the result on the vertical axis.

EXAMPLE 30

The aldehyde, 4-thia-3,6-dimethyloctan-1-al, is reduced using lithium aluminum hydride or sodium borohydride as in Example 24 (B) to form the C-1 alcohol. The alcohol is converted into the respective mesylate or halide using the procedures herein and then reacted with p-ethylphenol to yield 4-thia-3,6-dimethyloctanyl p-ethylphenyl ether.

In the same way, each of 4-thia-3,6-dimethyloctanyl p-chlorophenyl ether and 4-thia-3,6-dimethyloctanyl p-nitrophenyl ether is prepared.

What is claimed is:

1. A compound selected from the following formula:

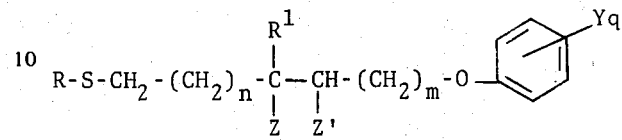

wherein,
  $m$ is zero or one;
  $n$ is zero, one or two;
  $R^1$ is methyl or ethyl;
  R is a branched lower alkyl of three to six carbon atoms;
  Y is lower alkyl;
  $q$ is zero, one, two or three; and
  each of Z and Z' is hydrogen or Z and Z' together form a carbon-carbon bond.

2. A compound according to claim 1 wherein Y is in the para position; $q$ is one; Y is lower alkyl of one to four carbon atoms; $m$ is one; $n$ is one; $R^1$ is mythyl; and R is i-propyl, t-butyl, t-i-pentyl or s-butyl.

3. A compound according to claim 2 wherein Y is ethyl.

4. The compound, 6-thia-3,7-dimethyloctanyl p-ethylphenyl ether, according to claim 3.

5. A compound according to claim 1 wherein Y is in the para position; $q$ is one; Y is lower alkyl of one to four carbon atoms; $m$ is zero; $n$ is one; each of Z and Z' is hydrogen; $R^1$ is methyl; and R is i-propyl, t-butyl, t-i-pentyl or s-butyl.

6. A compound according to claim 5 wherein Y is ethyl.

* * * * *